Aug. 17, 1965
H. F. CHASE
3,200,975
REFUSE CONTAINER AND TRANSPORTING VEHICLE
Filed March 31, 1964
3 Sheets-Sheet 1
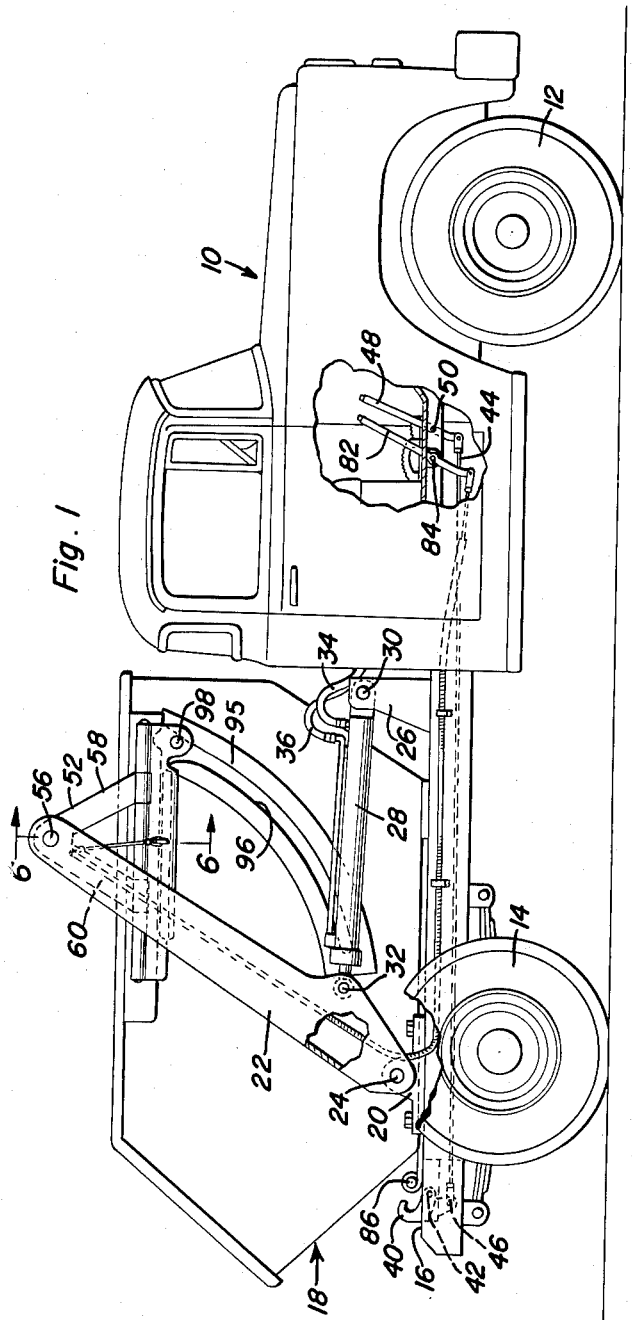
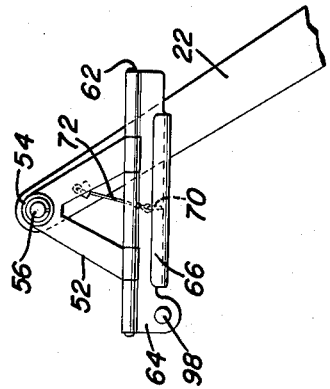
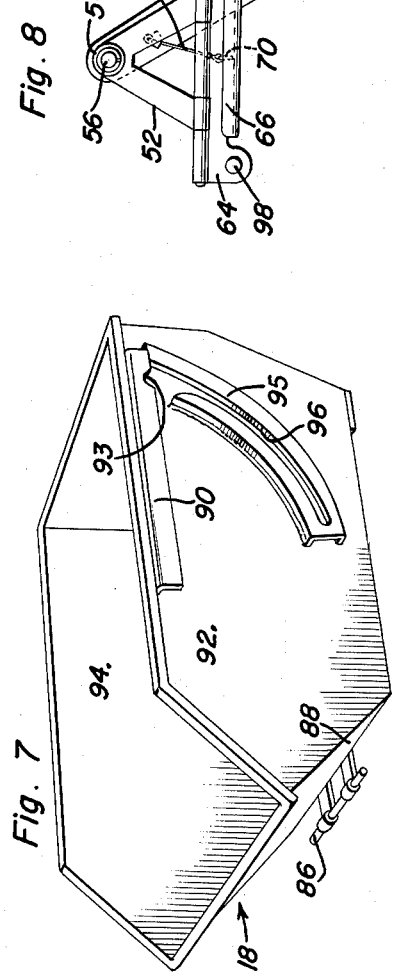
Harley F. Chase
INVENTOR.
BY Thomas A. O'Brien
and Harvey B. Jacobs
Attorneys

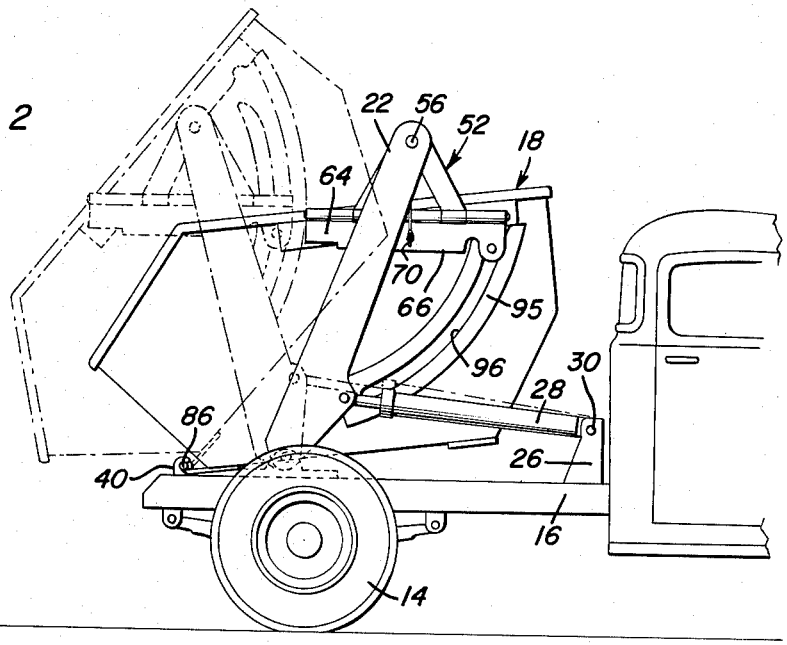
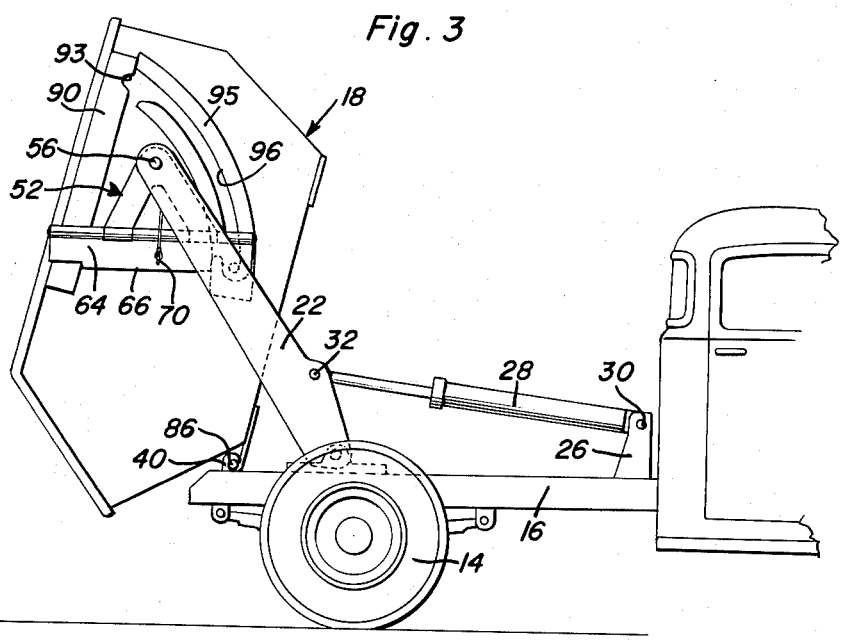

Aug. 17, 1965     H. F. CHASE     3,200,975
REFUSE CONTAINER AND TRANSPORTING VEHICLE
Filed March 31, 1964     3 Sheets-Sheet 3

Harley F. Chase
INVENTOR.

BY *Clarence A. O'Brien*
*and Harvey B. Jacobson*
Attorneys

United States Patent Office 3,200,975
Patented Aug. 17, 1965

3,200,975
REFUSE CONTAINER AND TRANSPORTING VEHICLE
Harley F. Chase, Rte. 1, Scott Depot, W. Va.
Filed Mar. 31, 1964, Ser. No. 356,269
9 Claims. (Cl. 214—317)

This invention relates to a novel and useful refuse container and transporting vehicle combination of the type including a vehicle having a generally horizontally disposed load bed and a pair of upstanding support arms pivotally supported from opposite sides of the vehicle at their lower ends for simultaneous swinging movement between first forwardly and upwardly inclined positions and second rearwardly and upwardly inclined positions about a generally horizontally disposed axis extending transversely of the vehicle.

The combination also includes a refuse container which is receivable on the load bed between the support arms and means is provided for releasably connecting the upper ends of the support arms to the container so that the latter may be lifted upwardly away from the load bed and swung to a position disposed rearwardly of the load bed and resting upon the ground on which the vehicle is disposed.

Several different types of loading, hauling and dumping apparatus has heretofore been designed such as those disclosed in U.S. Patent No. 2,313,514, dated Mar. 9, 1943 and U.S. Patent No. 3,056,516, dated Oct. 2, 1962. These previous forms of loading, hauling and dumping apparatus have included means in the form of chains and other tension members for releasably securing the upper ends of the support arms to the opposite sides of the container. These flexible tension members are also utilized to tilt the forward end of the refuse container upwardly and to the rear by means of the support arms when the rear lower portion of the refuse container is releasably pivotally secured to the load bed, the aforementioned loading, hauling and dumping apparatus also including means for releasably securing the rear portion of the refuse container to the load bed.

Inasmuch as flexible tension members are utilized, there are instances, when the refuse containers are pivoted to a dump position, when such flexible tension members do not maintain a rigid connection between the refuse container dumped and the support arms by which the container is being dumped.

In hauling, loading and dumping apparatus utilizing flexible tension members of the type hereinbefore set forth the lack of a positive connection between the support arms and the refuse container being dumped can result in the refuse container not being under the full control of the operator of the dumping vehicle as the container is being dumped. Some types of apparatus are constructed in a manner whereby the flexible tension members utilized momentarily lose positive control of the container being dumped as the container reaches a raised center position resulting in the upper end of the container falling rearwardly for a short distance until slack in the flexible tension members being utilized is again taken up and the support arms again control the rearward pivotal movement of the upper portion of the container.

This momentary loss of positive control of a container being pivoted to its full dump position places undue strain on the vehicle as well as the support arms and the container as the temporary loss in slack is suddenly taken up.

It is therefore the main object of this invention to provide a refuse container and transporting vehicle combination including means by which the refuse container may be selectively lifted from and disposed on the ground rearwardly of the load bed of the transporting vehicle or pivoted to a dumping position with the support arms of the vehicle maintaining constant control over the refuse container as it is being pivoted to the full dump position.

Another object of this invention, in accordance with the immediately preceding object, is to provide a refuse container and transporting vehicle combination constructed in a manner whereby the operator of the vehicle may, without the assistance of other workmen, releasably secure the support arms to a refuse container disposed on the ground, lift the refuse container up onto the load bed of his vehicle for transporting the refuse container to a dumping location and pivot a container supported from the load bed of the vehicle to a full dumping position. In this manner, only one workman is required for each transporting vehicle and the necessity of at least one other workman to accompany the driver of the vehicle for the purpose of securing flexible tension members such as hereinbefore set forth to a container which is to be lifted onto the transporting vehicle or which is to be pivoted on the transporting vehicle to a full dumping position is eliminated.

A final object of this invention to be specifically enumerated herein is to provide a refuse container and transporting vehicle combination in accordance with the preceding objects which will conform to conventional forms of manufacture, be of simple construction and easy to use so as to provide a device that will economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the refuse container and transporting vehicle combination of the instant invention with portions of the transporting vehicle being broken away to more clearly illustrate the structural details thereof;

FIGURES 2–4 of the drawings are fragmentary side elevational views of the combination illustrated in FIGURE 1 on somewhat of a reduced scale and showing the support arms of the vehicle in different positions of handling the refuse container;

FIGURE 7 is a perspective view of the refuse container; and,

FIGURE 8 is a fragmentary side elevational view of the inner side of one of the support arms of the transporting vehicle.

Figure 4:
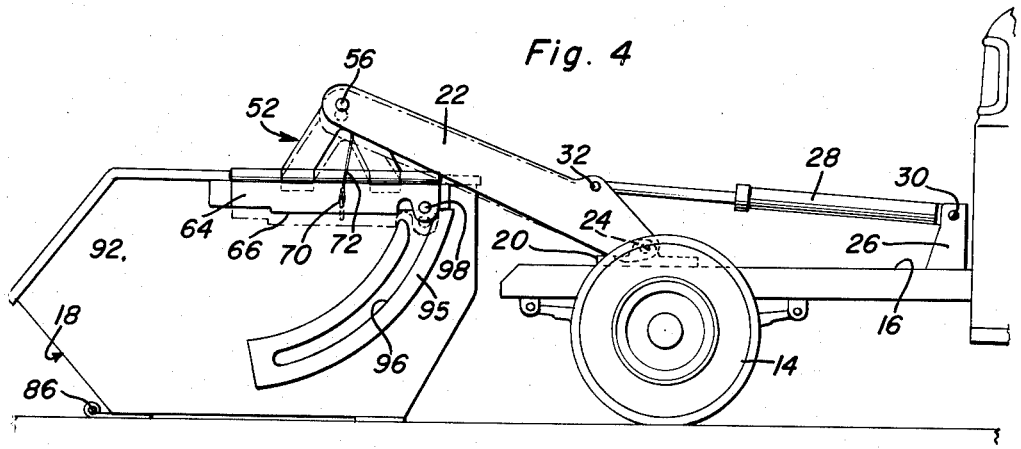
Figure 5:
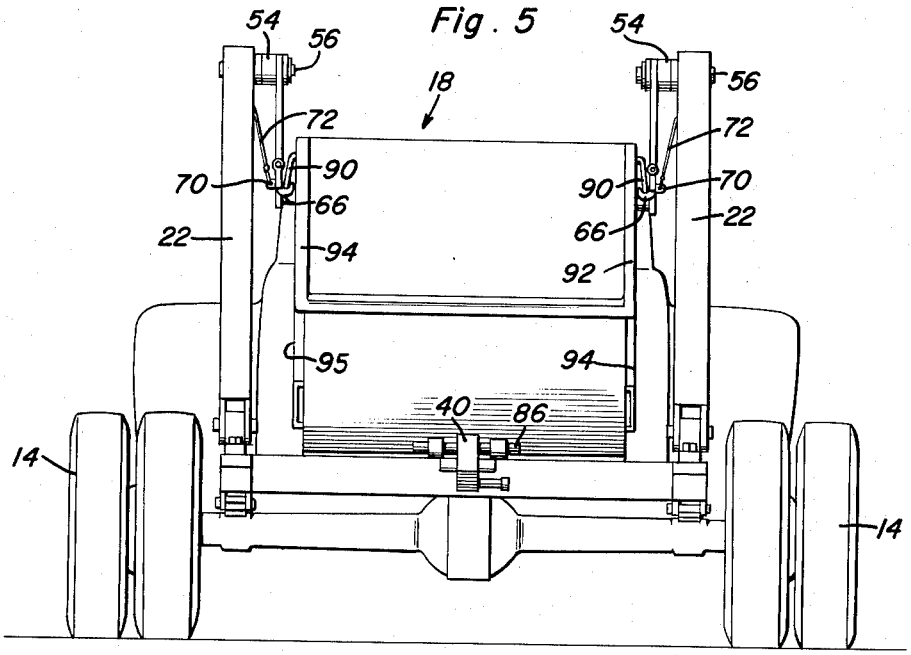
FIGURE 5 is a rear elevational view of the embodiment illustrated in FIGURE 1.

Referring now more specifically to the drawings the numeral 10 generally designates a conventional form of vehicle including front wheels 12 and rear wheels 14. The vehicle 10 also includes a load bed 16 and it may be seen from FIGURE 1 of the drawings that a refuse container generally referred to by the reference numeral 18 is receivable on the load bed 16.

The vehicle 10 includes a pair of opposite side journal supports 20 which have the lower ends of a pair of upstanding support arms 22 pivotally supported therefrom by means of pivot pins 24.

Suitable support stands 26 are carried by the opposite sides of the forward end of the load bed 16 and a pair of double acting hydraulic cylinders 28 are pivotally supported at one pair of corresponding ends to the support stands 26 by means of pivot pins 30 and to the lower end portions of the support arms 22 at the other pair of corresponding ends by means of pivot pins 32. It is to be understood that the hydraulic cylinders 28 are of the double-acting type and that hydraulic fluid under pressure may be selectively admitted into the front and rear ends of the cylinder 28 by means of suitable hydraulic lines 34 and 36, respectively. The hydraulic lines 34 and 36 may of course have their ends remote from the hydraulic cylinders 28 communicated with a suitable source (not shown) of fluid under pressure and suitable valve means (not shown) may be provided for controlling the flow of hydraulic fluid under pressure through the hydraulic lines 34 and 36.

The load bed 16 of the truck 10 has a retractible pivot hook 40 pivotally secured thereto by means of a pivot pin 42 and one end of a control rod 44 is pivotally secured to the pivot hook by means of a pivot pin 46 while the other end of the control rod is pivotally secured to one end of an actuating lever 48 disposed in the driver's compartment of the vehicle 10 and pivotally supported from the vehicle 10 by means of a pivot pin 50. The actuating lever 48 may of course be manipulated to swing the pivot hook 40 from the extended position illustrated in FIGURES 1–3 of the drawings to a retracted position with the pivot hook 40 swung below the upper surface of the load bed 16 as shown in FIGURE 4 of the drawings.

Figure 6:
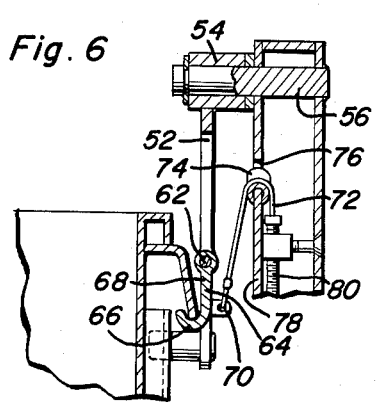
FIGURE 6 is an enlarged fragmentary transverse vertical sectional view taken substantially upon the plane indicated by the section line 6—6 of FIGURE 1.

From FIGURES 6 and 8 of the drawings it may be seen that a pair of generally A-shaped hanger frames 52 include journals 54 at their apex portions which are rotatably received on pivot shafts 56 secured through the upper ends of the arms 22.

The A-shaped hanger frames 52 each include a pair of upwardly converging legs 58 and 60 which are interconnected at their lower ends by means of a pivot shaft 62. Journaled on each pivot shaft 62 is a panel-like lifting member which is generally J-shaped in cross-section including an upstanding straight flange portion 64 which terminates at its lower end in an inturned and upwardly curving hook portion 66. Each of the lifting members is referred to by the reference numeral 68 and has a laterally outwardly projecting lug 70 secured thereto. A pair of elongated flexible pull members 72 have corresponding ends secured to the lugs 70 and are passed upwardly over pulley wheels 74 journaled in openings 76 formed in the inner sides 78 of the corresponding hollow support arms 22. The pull members 72 then pass through armored outer coverings 80 and down through corresponding support arms to the driver's compartment of the vehicle 10 where their other ends are secured to a second actuating lever 82. The actuating lever 82 is pivotally supported from the vehicle 10 by means of a pivot pin 84 and may have its upper portion pulled rearwardly in order to effect outward swinging movement of the lower ends of the lift members 68. From FIGURES 6 and 7 of the drawings it may be seen that the refuse container 18 is in the form of an open-top receptacle which has a pivot shaft 86 supported from the lower portion of its rear wall 88. The pivot shaft 86 is engageable with the pivot hook 40 as shown in FIGURES 2 and 3 of the drawings. In addition, the open-top receptacle 18 includes laterally outwardly projecting and downturned opposite side lift flanges 90 which are secured to the opposite side walls 92 and 94 of the container 18 adjacent their upper edge portions. The lift flanges 90 are notched as at 93, for a purpose to be hereinafter more fully set forth and in addition, each of the side walls 92 and 94 includes an arcuate guide 95 defining a slot 96.

It may also be seen from FIGURE 8 of the drawings that each of the lift members 68 includes an inwardly directed guide pin 98 and from FIGURES 1–3 of the drawings it may be seen that the guide pins 98 are receivable in the slots 96.

In operation, assuming that the vehicle 10 is first to pick up the refuse container from the ground and to lift the refuse container onto the load platform 16, the driver of the vehicle 10 backs the vehicle 10 toward the refuse container 18 until it is positioned as illustrated in FIGURE 4 of the drawings. Then, the hydraulic cylinders 28 are actuated to swing the upper ends of the arms 22 to the rear as illustrated in FIGURE 4 of the drawings until such time as the inwardly and upwardly curving portions 66 of the lift members 68 engage the downwardly and outwardly inclined lift flanges 90 on the opposite side of the refuse container 18. Continued downward movement of the hanger frames 52 caused by additional rearward swinging movement of the arms 22 results in the lift members 68 being pivoted outwardly until such time as the innermost portion of the inwardly and upwardly curving portions 66 pass beneath the lower edges of the lift flanges 90. Then the lift members 68 will pivot by gravity or by suitable spring pressure (not shown) to the position illustrated in FIGURE 6 of the drawings. Then, the hydraulic cylinders 28 may be actuated to swing the upper ends of the lift arms 22 forwardly to the positions illustrated in FIGURE 1 of the drawings whereupon the refuse container 18 will be lifted upon the load bed 16. Then, the vehicle 10 may be driven to any suitable dumping location for dumping the refuse container 18. In order to dump the refuse container 18, the pivot hook 40 is extended as shown in FIGURE 1 of the drawings and the hydraulic cylinders 28 are actuated to pivot the upper ends of the lift arms 22 rearwardly whereupon the heavier rear end of the refuse container 18 will be shifted rearwardly until such time as the pivot pin engages the pivot hook 40. At this point the pins 98 are still seated in the notched portions 93. However, continued rear swinging movement of the upper ends of the support arms 22 will pivot the refuse container 18 from the position illustrated in solid lines in FIGURE 2 of the drawings to the position illustrated in phantom lines in FIGURE 2 of the drawings and then subsequently to the full dumping position illustrated in FIGURE 3 of the drawings.

It will be noted that, inasmuch as the approximate center of the arc of curvature of the slot 96 is disposed rearwardly of the axes of rotation of the hanger frames 52, pivotal movement of the refuse container from the position illustrated in solid lines in FIGURE 2 of the drawings will result in the pins 98 passing downwardly through the slots 96. The hanger frames 52 are maintained against displacement from their substantially horizontally disposed positions by means of the guiding action of the slots 96 and the fact that the refuse container 18 is pivoting about an axis defined by the pivot shaft or pin 86 which is laterally spaced from the axes of rotation of the support arms 22.

Therefore, it may be seen that once the pins 98 are disposed in the slots 96 as the hanger frames are initially engaged with the lifting flanges 90 by the operation illustrated in FIGURES 4 and 6 of the drawings, the support arms 22 maintain constant control over the refuse container 18. When the refuse container 18 is being lifted from or onto the load bed 16 when the pivot shaft 86 is not engaged with the pivot hook 40, the full weight of the container 18 is supported by the hanger frames 52 and the seating of the pins 98 in the notched portions 93 prevents longitudinal shifting movement of the refuse container 18 relative to the hanger frames 52. However, there is a slight shifting of the refuse container 18 relative to the rear ends of the inwardly and upwardly curved portions 66 of the lift members 68 when the lift arms 22 are pivoting the refuse container 18 to the full dump position illustrated in FIGURE 3 of the drawings.

With attention now directed to FIGURES 2 and 3 of the drawings it may be seen that the slots 96 converge forwardly toward the lower edge portions of the lift members 68. In this manner, the rear end of each of the inwardly and upwardly curving portions 66 and the corresponding pin 98 are able to support the refuse container 18 even when the latter is in the full dump position illustrated in FIGURE 3 of the drawings. Additionally, it may be seen that the engagement of the pins 98 in the slots 96 prevents any slack or lost motion connection between the refuse container 18 and the support arms 22. Therefore, there is no instance wherein the pivoting of the refuse container past a center position causes a momentary lack of control of the support arms 22 over the pivoting movement of the refuse container 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A refuse container and transporting vehicle combination, said vehicle including a load bed, a pair of upstanding support arms pivotally supported from opposite sides of said vehicle at their lower ends for simultaneous movement between first forwardly and upwardly inclined positions and second rearwardly and upwardly inclined positions about generally horizontally disposed and aligned axes extending transversely of said vehicle, a pair of hanger frames pivotally supported from the upper end portions of said arms for rotation about axes generally paralleling the first mentioned axes, said container being receivable on said load bed between said arms and said hanger frames when said arms are in said second positions, the rear lower end of said container and said load bed including first coacting means, capable of being rendered inoperative, releasably pivotally connecting said container to said load bed for rotation about an axis generally paralleling the first mentioned axes, said hanger frames and the corresponding opposite sides of said container including second coacting means releasably securing said frames to said container for lifting and swinging the latter off said load bed and to the ground disposed rearwardly of said load bed upon rearward swinging movement of said arms and vice versa when said coacting means are inoperative and for automatically pivotally supporting said container from said hanger frames, when said first coacting means are operative, for swinging the forward end of said container upwardly about said axis upon rearward swinging movement of said arms and for subsequently lowering the forward end of said container upon forward swinging movement of said arms.

2. The combination of claim 1 wherein said combination includes means connected between said arms and said load bed for swinging said arms relative to said bed.

3. The combination of claim 1 wherein said second coacting means include means operable to automatically releasably secure said hanger frames to said containers upon the lowering of said hanger frames alongside the opposite sides of said container.

4. The combination of claim 1 wherein said second coacting means include a pair of laterally outwardly spaced depending lifting flanges carried by the upper marginal edge portions of the opposite sides of said container and a pair of upright flanges pivotally secured at their upper edge portions to the lower portions of said hanger frames for rotation about axes extending along said flanges and longitudinally of said load bed, said upright flanges including laterally and upwardly directed lower end portions projecting upwardly and toward each other and engageable behind the lower ends of said lifting flanges.

5. The combination of claim 1 wherein said combination includes means operatively connected between said load bed and said upright flanges for swinging the lower ends of said upright flanges away from each other.

6. The combination of claim 1 wherein said second coacting means include a pair of laterally outwardly spaced depending lifting flanges carried by the upper marginal edge portions of the opposite sides of said container and a pair of upright flanges pivotally secured at their upper edge portions to the lower portions of said hanger frames for rotation about axes extending along said flanges and longitudinally of said load bed, said upright flanges including laterally and upwardly directed lower end portions projecting upwardly and toward each other and engageable behind the lower end of said lifting flanges, said flanges being downwardly divergent whereby their remote surfaces define cam surfaces engageable by said lower end portions to cam the lower ends of said upright flanges away from each other as said lower end portions are lowered past said lift flanges.

7. The combination of claim 1 wherein said second coacting means include a pair of laterally outwardly spaced depending lifting flanges carried by the upper marginal edge portions of the opposite sides of said container and a pair of upright flanges pivotally secured at their upper edge portions to the lower portions of said hanger frames for rotation about axes extending along said flanges and longitudinally of said load bed, said upright flanges including laterally and upwardly directed lower end portions projecting upwardly and toward each other and engageable behind the lower ends of said lifting flanges, said flanges being downwardly divergent whereby their remote surfaces define cam surfaces engageable by said lower end portions to cam the lower ends of said upright flanges away from each other as said lower end portions are lowered past said lifting flanges, said upright flanges each further including an inwardly projecting lug at their forward end portions disposed in substantially horizontal alignment with said laterally directed lower end portions, said lifting flanges, forwardly of said laterally directed lower end portions including downwardly opening notches in which said lugs are received.

8. The combination of claim 1 wherein said second coacting means include a pair of laterally outwardly spaced depending lifting flanges carried by the upper marginal edge portions of the opposite sides of said container and a pair of upright flanges pivotally secured at their upper edge portions to the lower portions of said hanger frames for rotation about axes extending along said flanges and longitudinally of said load bed, said upright flanges including laterally and upwardly directed lower end portions projecting upwardly and toward each other and engageable behind the lower ends of said lifting flanges, said flanges being downwardly divergent whereby their remote surfaces define cam surfaces engageable by said lower end portions to cam the lower ends of said upright flanges away from each other as said lower end portions are lowered past said lift flanges, said upright flanges each further including an inwardly projecting lug at their forward end portions, said second coacting means further including means defining an outwardly opening downwardly and rearwardly curving groove on each side of said container in which said lugs are slidable, said grooves being generally arcuate and having their approximate centers disposed rearwardly of the axes of rotation of said hanger frames relative to said arms.

9. The combination of claim 8 wherein the axis of rotation defined by said first coacting means is disposed rearwardly of the axes of rotation of the lower ends of said arms relative to said load bed.

References Cited by the Examiner

UNITED STATES PATENTS 2,313,514 8/43 Brooks _____ 214—77 X
3,056,516 10/62 Cole _____ 214—77

HUGO O. SCHULZ, *Primary Examiner.*